US009322999B2

(12) United States Patent
Krauss et al.

(10) Patent No.: US 9,322,999 B2
(45) Date of Patent: Apr. 26, 2016

(54) WAVE VECTOR MATCHED RESONATOR AND BUS WAVEGUIDE SYSTEM

(75) Inventors: Thomas Fraser Krauss, Fife (GB); William Whelan-Curtin, Fife (GB); Kapil Debnath, Fife (GB); Karl Peter Welna, Fife (GB)

(73) Assignee: UNIVERSITY COURT OF THE UNIVERSITY OF ST ANDREWS, St Andrews (GB)

( * ) Notice: Subject to any disclaimer, the term of this patent is extended or adjusted under 35 U.S.C. 154(b) by 0 days.

(21) Appl. No.: 14/122,132

(22) PCT Filed: Jul. 27, 2012

(86) PCT No.: PCT/GB2012/000618
§ 371 (c)(1),
(2), (4) Date: Feb. 17, 2014

(87) PCT Pub. No.: WO2013/017814
PCT Pub. Date: Feb. 7, 2013

(65) Prior Publication Data
US 2014/0185982 A1  Jul. 3, 2014

(30) Foreign Application Priority Data
Jul. 29, 2011  (GB) .................................. 1113125.7

(51) Int. Cl.
*G02B 6/26* (2006.01)
*G02B 6/122* (2006.01)
(Continued)

(52) U.S. Cl.
CPC . *G02B 6/26* (2013.01); *B82Y 20/00* (2013.01); *G02B 6/1225* (2013.01); *G02F 1/015* (2013.01); *G02F 1/3133* (2013.01); *G02B 2006/12142* (2013.01); *G02F 2001/0152* (2013.01); *G02F 2001/0157* (2013.01); *G02F 2202/32* (2013.01);
(Continued)

(58) Field of Classification Search
USPC ............................................................ 385/28
See application file for complete search history.

(56) References Cited

U.S. PATENT DOCUMENTS

| 5,199,092 | A | 3/1993 | Stegmueller |
| 6,411,752 | B1 | 6/2002 | Little et al. |

(Continued)

FOREIGN PATENT DOCUMENTS

| EP | 2375242 A1 | 12/2011 |
| WO | 2007134177 A3 | 11/2007 |
| WO | 2008048633 A1 | 4/2008 |

OTHER PUBLICATIONS

Little et al., "Vertically Coupled Glass Microring Resonator Channel Dropping Filters", Feb. 1999, IEEE Photonics Technology Letters, vol. 11, No. 2, pp. 215-217.*

(Continued)

*Primary Examiner* — Daniel Petkovsek
(74) *Attorney, Agent, or Firm* — Moore & Van Allen PLLC; W. Kevin Ransom

(57) ABSTRACT

An optical device including: a waveguide of refractive index $n_a$ for carrying at least one mode of at least one wavelength, and at least one resonator with a resonant wavelength. The resonator has a mode volume of less than ten cubic resonant wavelengths. In use light in the waveguide is vertically coupled into the at least one resonator, and the waveguide and resonator(s) are arranged to provide wave-vector matching between at least one mode of the resonator and at least one mode of the waveguide.

23 Claims, 11 Drawing Sheets

(51) Int. Cl.
*G02F 1/015* (2006.01)
*G02F 1/313* (2006.01)
*B82Y 20/00* (2011.01)
*G02B 6/12* (2006.01)

(52) U.S. Cl.
CPC ....... *G02F 2203/15* (2013.01); *G02F 2203/585* (2013.01)

(56) References Cited

U.S. PATENT DOCUMENTS

| | | | |
|---|---|---|---|
| 6,636,668 B1* | 10/2003 | Al-hemyari et al. | 385/40 |
| 6,665,476 B2* | 12/2003 | Braun et al. | 385/50 |
| 7,215,848 B2* | 5/2007 | Tan et al. | 385/32 |
| 7,231,113 B2* | 6/2007 | Chu et al. | 385/30 |
| 2004/0114899 A1* | 6/2004 | Mattsson | G02B 6/12007 385/129 |
| 2005/0220396 A1 | 10/2005 | Kee et al. | |
| 2006/0078254 A1* | 4/2006 | Djordjev | G02B 6/12007 385/32 |
| 2008/0063339 A1 | 3/2008 | Spillane et al. | |
| 2010/0288341 A1 | 11/2010 | Kim et al. | |

OTHER PUBLICATIONS

Min Qiu; "Vertically coupled photonic crystal optical filters", Journal: Optics Letters, vol. 30, No. 12, Jan. 1, 2005.

Little et al.; "Wavelength Switching and Routing Using Absorption and Resonance", Journal: IEEE Photonics Technology Letters, vol. 10, No. 6, Jun. 1, 1998.

Satoki Kawanishi; "High-speed optical transmission technology using all-optical signal processing", Journal: SPIE proceedings, vol. 6351, Sep. 21, 2006.

Fang et al.; "A distributed feedback silicon evanescent laser", Optics Express: vol. 16, No. 7, Mar. 31, 2008.

Dong et al.; "Low power and compact reconfigurable multiplexing devices based on silicon microring resonators", Optics Express: vol. 18, No. 10, May 10, 2010.

Xu et al.; "Cascaded silicon micro-ring modulators for WDM optical interconnection", Optics Express: vol. 14, No. 20, Oct. 2, 2006.

McNab et al.; "Ultra-low loss photonic integrated circuit with membrane-type photonic crystal waveguides", Optics Express: vol. 11, No. 22, Nov. 3, 2003.

GB Search Report for GB1113125.7 dated Nov. 25, 2011.

International Search Report for PCT/BG2012/000618 dated Nov. 6, 2012.

* cited by examiner (a)

(b)

(c)

WAVE VECTOR MATCHED RESONATOR AND BUS WAVEGUIDE SYSTEM

CROSS-REFERENCE TO RELATED APPLICATIONS

This application claims is a national stage application (filed under 35 §U.S.C. 371) of PCT/GB2012/000618, filed Jul. 27, 2012 of the same title, which, in turn, claims priority to United Kingdom Application No. 1113125.7, filed Jul. 29, 2011 of the same title; the contents of each of which are hereby incorporated by reference.

INTRODUCTION

The present invention relates to an optical device having a low to moderate refractive index contrast bus waveguide coupled to one or more nano/microphotonic resonators for use in optical communications and in particular for use in wavelength division multiplexing (WDM) technology.

FIELD OF INVENTION

Wavelength division multiplexing, referred to as WDM, is a technique utilized to increase the transmission capacity of an optical communication system by allowing multiple data channels to transit through a single optical transmission line.

Different implementations of the technique have been reported. The most common approach, illustrated in FIG. 1 relies on multiple wavelength lasers modulated separately and combined into a single channel by a multiplexer. Fang et al (Optics Express, 2008, Vol 16, pp 4413) proposed using silicon technology to implement 25 distributed feedback lasers, monolithically coupled to 25 modulators operating at 40 Gb/s and multiplexed together into a single waveguide to form a wavelength division multiplexed 1 Tb/s data stream. A problem with this approach is that interfaces between the different constituents of the WDM device generate a significant amount of back reflection, which destabilizes the source(s). Additionally, the complexity of this approach results in extremely tight fabrication tolerances, which are difficult to attain in practice.

Another approach based on a series of tunable ring resonators with characteristic resonant wavelengths attached to a silicon bus waveguide has been demonstrated by Dong (Optics express, 2010, Vol 18 pp 9852) using thermally reconfigurable microring resonators and by Xu (Optics Express, 2006, 14, pp 9430) using carrier injection in a microresonator connected to a PIN junction. This technology allows the combination of light filtering, modulation and multiplexing in a single, silicon based device. However, the use of a silicon waveguide makes integration of the device with optic fiber relatively complex and inefficient due to the mismatch of refractive index between the two materials.

U.S. Pat. No. 6,411,752 describes a wavelength modulator apparatus that has a series of vertically coupled optical ring resonator devices over a cross grid waveguide architecture. The resonators are vertically coupled on top of the bus waveguides and are separated from the waveguides by a buffer layer. Resonance occurs when light coupled into the ring interferes with light passing through the bus waveguide. A problem with the modulator described in U.S. Pat. No. 6,411,752 is that it requires stringent wave vector (defined as $|k|=2\Pi/\lambda$, with the direction perpendicular to the wave fronts)—matching conditions to be satisfied, which limit the choices for the materials of the bus waveguide and ring resonators. This prevents the use of the most promising configurations for low insertion loss operation, such as glass based bus waveguides and silicon ring resonators.

Spot size converters are currently the most popular solution to the general issue of coupling between waveguides of different dimension, composition and refractive index [see for example U.S. Pat. No. 5,199,092]. This technique requires a tapering of one or both of the waveguides in question to achieve a transition between the mismatched modes. The fabrication of the taper, in particular, the tip is challenging. While this approach works well under ideal conditions [Optics Express 11, 2927-2939 (2003)]; in general, losses of 1.5-2 dB per interface are reported. Other problems are that high performance lithographic techniques are needed to fabricate the converters, and the number of devices that can be cascaded is limited due to cumulative losses.

SUMMARY OF INVENTION

According to the present invention, there is provided an optical device for use in optical communication including: a waveguide of refractive index $n_a$ for carrying at least one mode at one wavelength, and at least one resonator with a resonant wavelength that has a mode volume of less than ten cubic resonant wavelengths, wherein in use light in the waveguide is vertically coupled into at least one resonator and the waveguide and resonator(s) are adapted, so that wavevector matching is achieved between at least one mode of the resonator and at least one mode of the waveguide.

The resonator(s) may be in a layer of refractive index $n_b$, not equal to $n_a$, and the device further comprises; a barrier layer of refractive index $n_c$, whereby $n_c < n_a$ and $n_c < n_b$, and a substrate of refractive index $n_d < n_b$; wherein the resonator layer is between the barrier layer and the substrate, and the waveguide is on top of the barrier layer and aligned with the resonator(s), thereby allowing for optical coupling between the waveguide and the resonator(s). The lower cladding may have a non-uniform thicknesses and/or a non-uniform composition. The barrier layer may have a non-uniform thickness.

The waveguide may be a single mode waveguide or a multimode waveguide.

The resonator(s) carries one or more modes, among which at least one cavity-mode overlaps spatially with at least one mode propagating through the waveguide, thereby allowing for coupling of light from the waveguide to the resonator.

The device may have N wavelength specific resonators, so as to be operable as an Nth order filter.

At least one resonator may be embedded in a PIN junction forming a resonator-modulator. The at least one resonator-modulator may be an electro-absorption modulator.

A plurality of the resonators may be coupled together to form a waveguide acting as an optical delay line with a "flat-top" spectral response.

The at least one resonator may be adapted to provide two degenerate resonances at the resonance frequency.

The waveguide may be a dielectric waveguide or a polymer waveguide. The waveguide may be made of glass, for example Silicon Oxynitride or TRIPLEX or a HYDEX.

The resonator may be selected from a wide range of devices, such as a photonic crystal defect cavity; a plasmonic structure; a nanoantenna or a split ring.

The photonic crystal may be made of Silicon Nitride or of a III-V semiconductor material such as Indium Phosphide, Gallium Arsenide, Gallium Nitride or Indium Gallium Phosphide.

Where the resonator is a photonic crystal, the resonator may have an engineered mode dispersion, so that the optical path inside the resonator is constant over a given wavelength interval.

Where the resonator is a photonic crystal, the at least one resonator may be doped with material having an absorption band corresponding to the resonant wavelength of the doped resonator, wherein a resonant mode coupling into the cavity excites a photogenerated carrier.

The resonator may be made of a Silicon/Germanium multilayer.

The optical arrangement may be such that in use light in the waveguide is coupled vertically to the at least one resonator.

The device may have multiple resonators, each resonant at a different wavelength. A modulator may be associated with each resonator. The modulator may be operable to change the resonant wavelength of its associated resonator.

BRIEF DESCRIPTION OF THE DRAWINGS

Various aspects of the invention will now be described by way of example only and with reference to the accompanying drawings, of which.

DETAILED DESCRIPTION OF THE INVENTION

Figure 1:
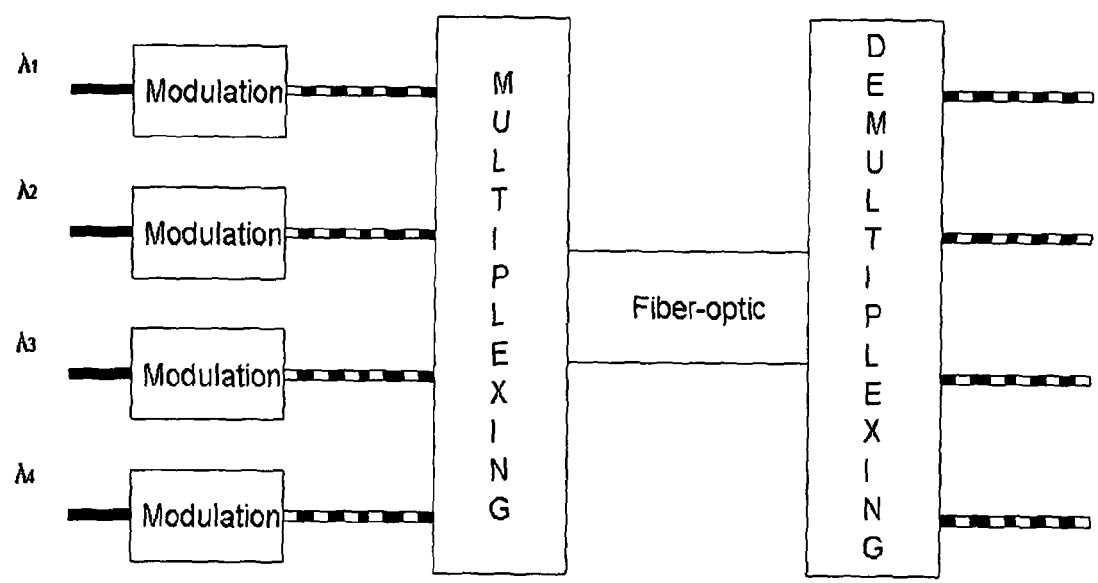
FIG. 1 shows a prior art system for wavelength division multiplexing which relies on multiple wavelength lasers modulated separately and combined into a single channel by a multiplexer.
Figure 2:
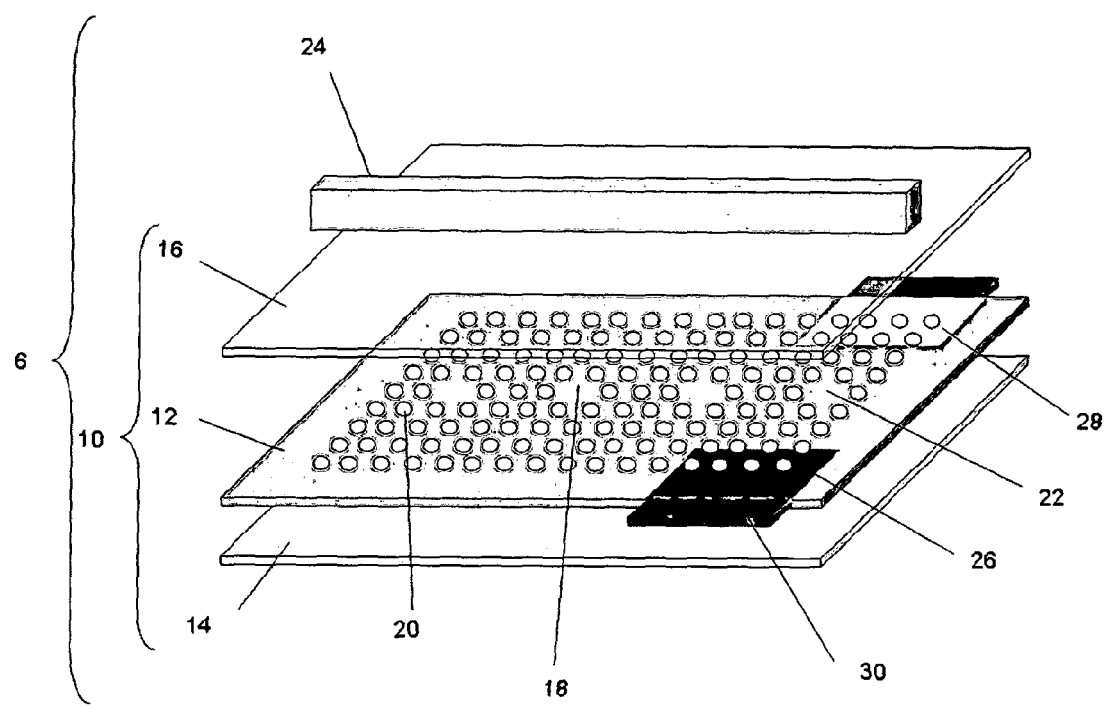
FIG. 2 shows an exploded perspective view of a simplified WDM modulator device.
Figure 3:
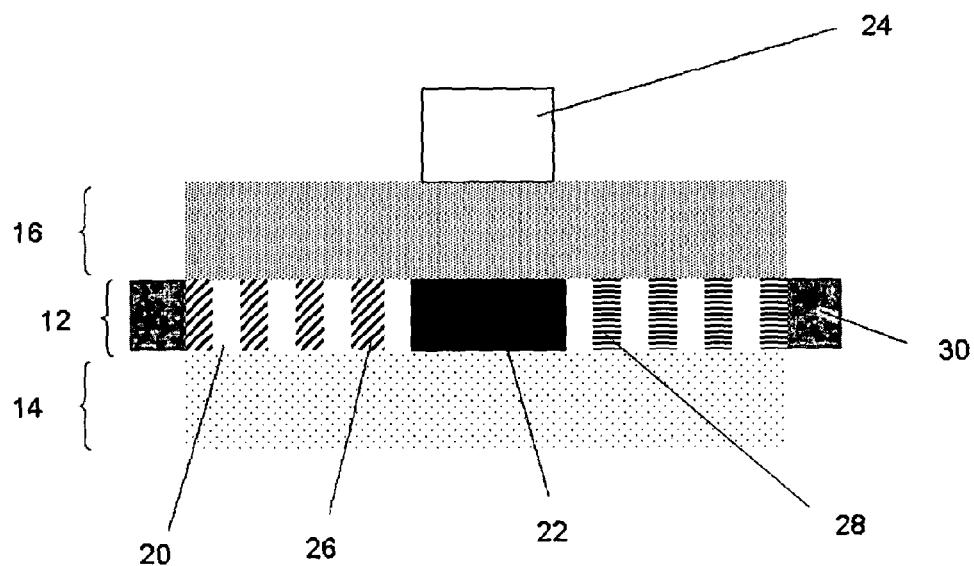
FIG. 3 shows a cross sectional view of the WDM modulator of FIG. 2.

FIGS. 2 and 3 show a WDM modulator device 6. The device has a bus waveguide 24 of refractive index $n_a$, monolithically integrated with a photonic crystal assembly 10. The photonic crystal assembly 10 has a photonic crystal slab 12, made of a material of refractive index $n_b$ arranged between a substrate layer 14 of refractive index $n_d$ and a barrier dielectric layer 16 of refractive index $n_c$. The photonic crystal slab 12 has a network of air holes 20 forming a regular lattice interrupted by a series of defect-cavity resonators 18.

Each resonator is created by a structural defect in the photonic crystal, thereby forming an optical mode localized to the defect region. The mode volume of the cavity modes is small enough to generate broad wave-vector distributions, resulting in increased coupling with the waveguide. In particular, the mode volume of each cavity is less than ten cubic wavelengths, where the wavelength is the resonant wavelength of the cavity. Every defect-cavity is an optical resonator with resonant conditions dictated by the size of the defect-cavity. Depending on specific applications, each resonator in the device may be designed with a unique resonant wavelength. Only the waveguide modes at the resonant frequency couple to the cavity, therefore performing filtering action.

The resonators are each embedded between a P doped region 26 and an N doped region 28 of the photonic crystal slab 12 to form a resonator-modulator 22 (only one is shown in FIG. 2 for clarity). Each resonator-modulator can be controlled individually by varying a voltage applied to its associated P and N doped regions 26 and 28 respectively. As a result different wavelengths of light in the waveguide can be individually and separately modulated using the resonator modulators, each wavelength of light in the waveguide being matched with one of the resonator modulators. This is described in more detail later.

The bus waveguide 24 extends along the longitudinal axis of the photonic crystal assembly 10 and is placed on top of the barrier layer so as to align vertically with the series of defect-cavity resonators 18. The thickness profile of the barrier layer may vary to promote or repress coupling between the waveguide and the defect-cavities in different parts of the WDM device. The relative values of the refractive indices $n_a$, $n_b$, $n_c$ and $n_d$ are chosen to promote the vertical evanescent coupling between the at least one mode propagating through the bus waveguide 24 and the series of modes propagating through the resonant cavities 18 present in the photonic crystal slab 12. This is typically achieved when the following set of conditions are met: $\{n_c<n_a, n_c<n_b, n_b \neq n_a, n_d<n_b\}$. In most cases, the material used has $n_b>1.8$.

Figure 4:
FIG. 4 shows a schematic representation of a WDM device in use with a fiber optic and photo-detector arrangement.

The WDM modulator device 6 of FIGS. 2 and 3 can be used in an in-line modulation configuration, as shown in FIG. 4. Here, a fiber optic cable is used to transmit light into the device. The light is filtered and modulated using the WDM modulator device, and then transmitted via another fiber optic cable to in-line wavelength selective photodetectors.

Figure 5:
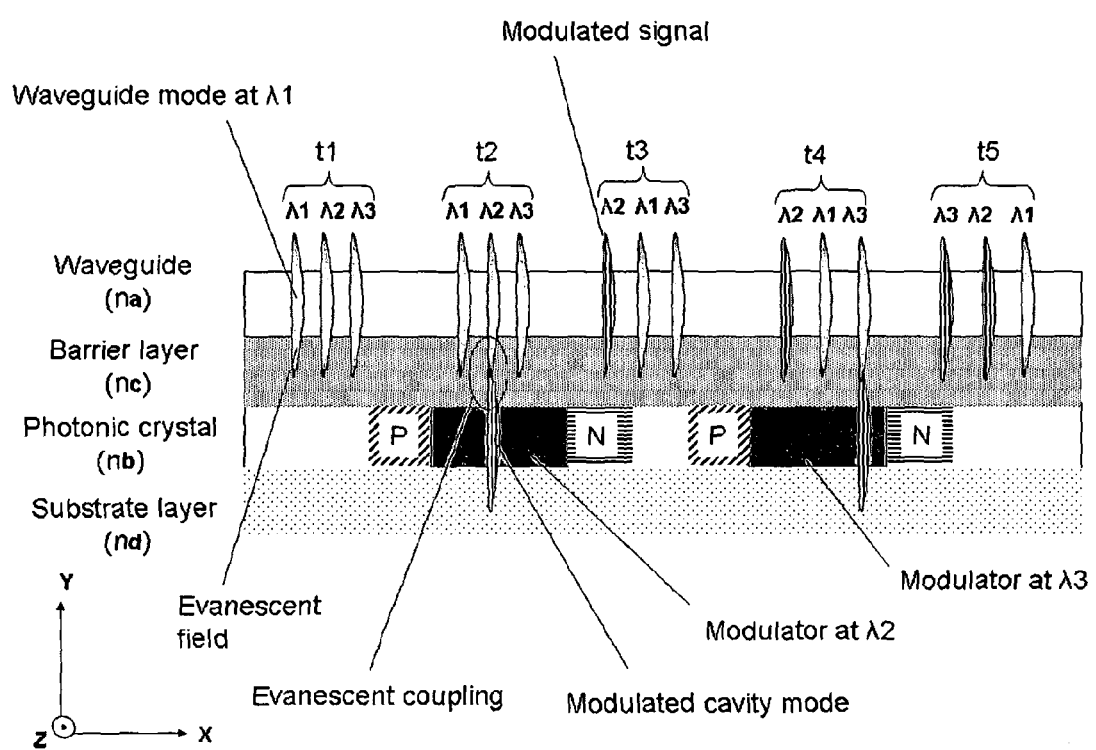
FIG. 5 shows a schematic representation of the principle of operation of the device.

FIG. 5 shows the principle of operation of the device. This is a schematic representation of a multiwavelength signal propagating along the waveguide at different times. In this case, the device has two resonators resonant at λ2, λ3.

At time t1, a multiwavelength signal represented by three waves with wavelength λ1, λ2, λ3 is coupled to the waveguide. The waveguide carries a single mode defined by a mode propagation vector $k=2\pi n_{eff}/\lambda_0$ where $\lambda_0$ is the vacuum wavelength and $n_{eff}$ is the effective refractive index of the waveguide at that wavelength. The signal travels in the waveguide via total internal reflection generating an evanescent field extending in the barrier layer.

At time t2 the multiwavelength signal passes over a first defect-cavity resonator. The evanescent tail of the mode propagating through the cavity extends into the barrier layer resulting in the evanescent coupling between the waveguide mode and the cavity mode. The first defect-cavity resonator is designed to be resonant at λ2, leading to the spontaneous coupling of the λ2 component of the signal to the defect-cavity resonator.

Figure 6:
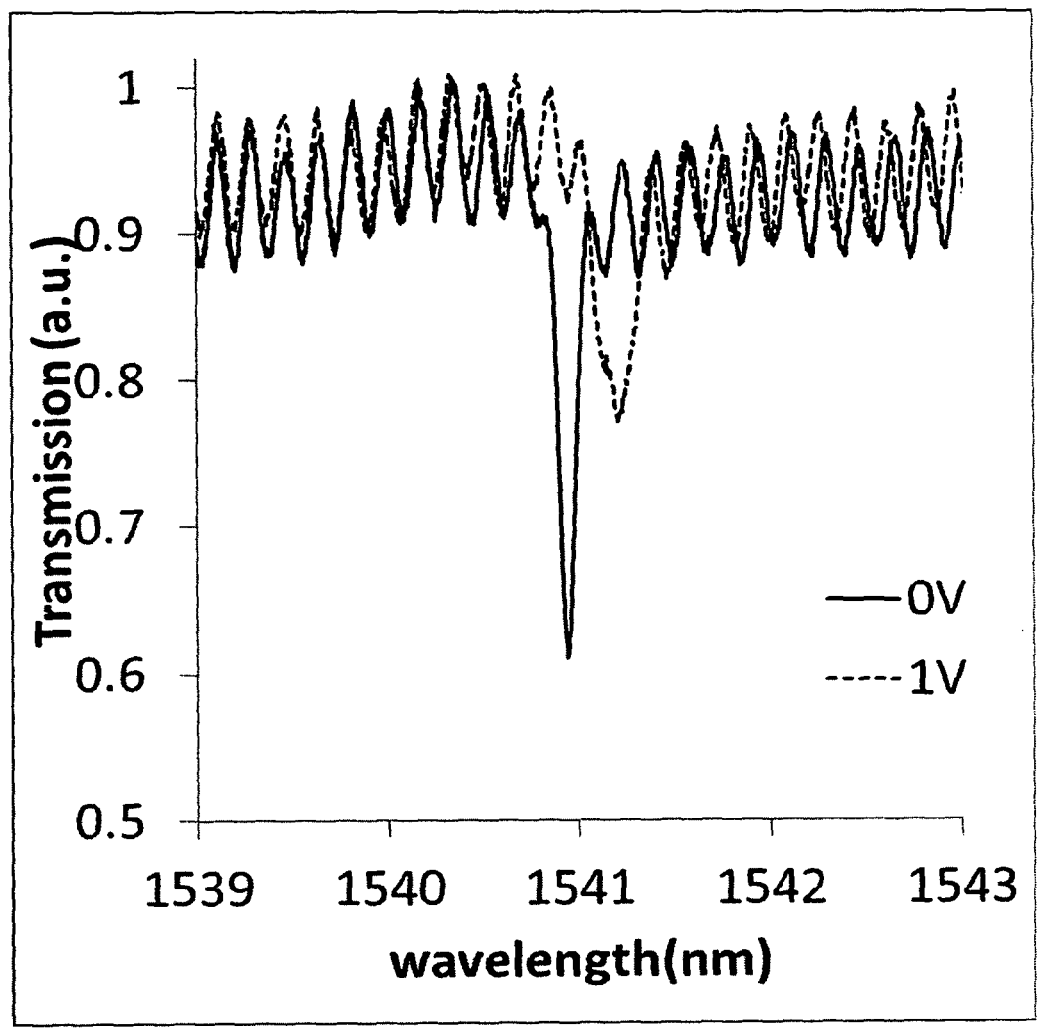
FIG. 6 shows the experimental transmission coupling response of a photonic crystal cavity modulator coupled to a polymer waveguide and tuned using an integrated PIN diode.

Signal modulation is achieved by applying a voltage across the PIN junction. This generates a current across the defect-cavity modifying the refractive index and the resonant wavelength of the cavity via the carrier-plasma dispersion effect. When the cavity is off resonance, the λ2 component passes over the cavity without being affected. Hence, by varying the voltage applied to the PIN junction, the λ2 light can be selectively modulated. FIG. 6 shows experimental data on this. Alternatively, modulation may be achieved by using a defect-cavity resonator formed in a Silicon/Germanium multilayer 23 embedded in a biased PIN junction. Generation of a field across the PIN junction shifts the absorption band of the Silicon/Germanium multilayer. By varying the field across the PIN junction, the resonator can be operated as an electroabsorption modulator.

At time t4 the multiwavelength signal passes over the second defect-cavity resonator with resonant wavelength λ3, leading to the coupling and modulation of the λ3 component of the signal. At time t5 the modulated mode at λ3 couples back to waveguide. Hence, the light at the output of the waveguide is wavelength division multiplexed, with different wavelengths modulated to carry different data/information.

Whilst two resonators are shown, it will be appreciated that the basic principle of operation shown in FIG. 5 can be extended to N defect-cavity resonators with the primary limitation being the free spectral range of the resonator. In many cases, single mode photonic crystal cavities may be used giving a free spectral range in excess of 500 nm, thereby providing a very large number of WDM channels.

The coupling strength between the waveguide and the cavity modes is determined by the spatial mode overlap and the wave-vector matching between the two modes. Spatial overlap is controlled by the thickness of the barrier layer and the design of the defect-cavity resonator. The evanescent coupling between the waveguide and cavity modes occurs in the barrier layer. As a result, the thickness of the barrier layer controls the degree of overlap between the evanescent tails of the two modes [Optics Letters 30, 1476-1478 (2005)].

Figure 7:
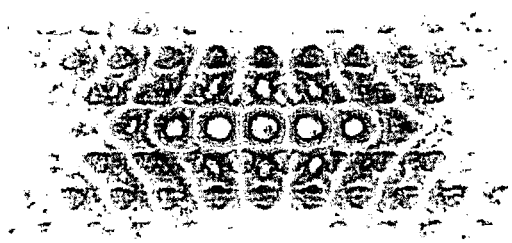
FIG. 7 shows the mode profile of an example resonator (a), the corresponding k-space distribution (b) and the k-space distribution of the bus waveguide (c)
Figure 7:
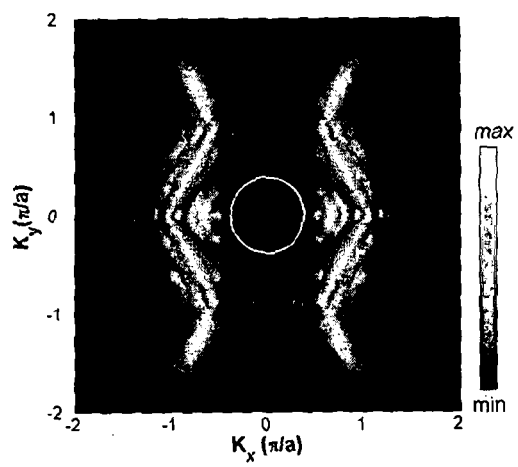
Figure 7:
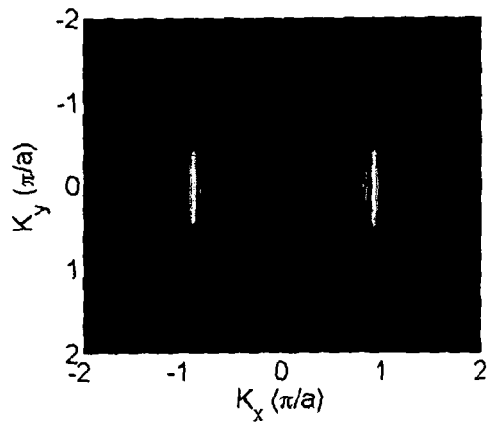

FIG. 7(a) shows the mode profile of an example resonator. The defect-cavity resonators are designed to have a mode volume of up to ten cubic resonant wavelengths. As a result of this strong spatial confinement, the supported mode has a broad wave-vector space (broad momentum distribution), see FIG. 7b. To achieve coupling between the cavity mode and bus waveguide, there must be a k-space overlap between the two (see FIG. 7c for the corresponding wave-vector space).

Figure 8:
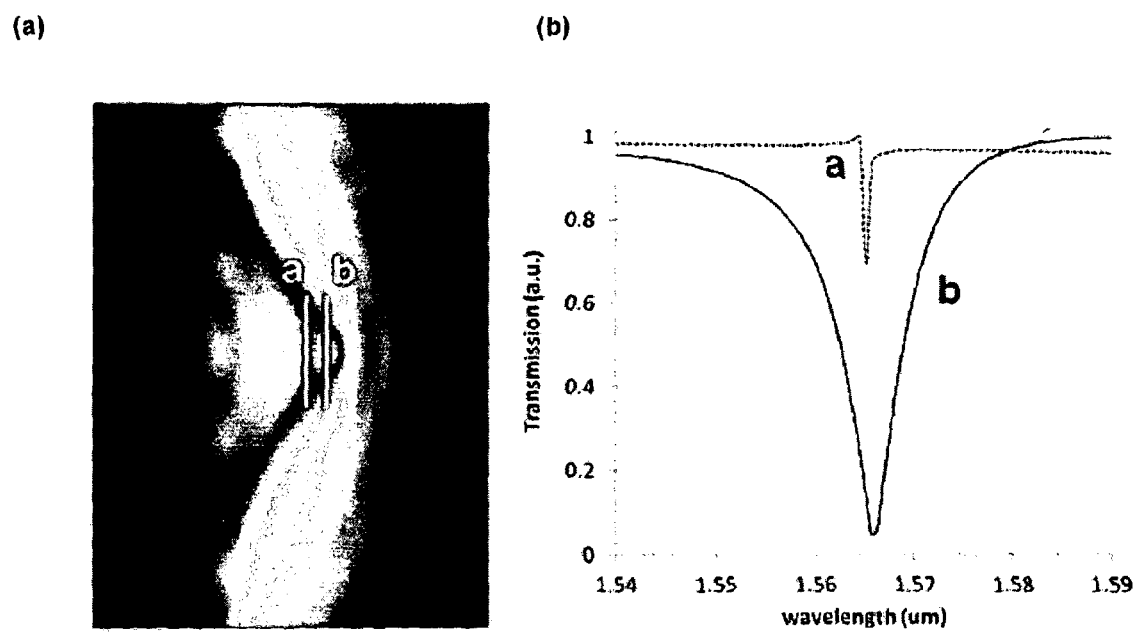
FIG. 8 shows (a) a close-up of the resonator's k-space area overlapping with the waveguide k-space and (b) the simulated coupling response (3D Finite Difference Time Domain) when different bus waveguides are used.
Figure 9:
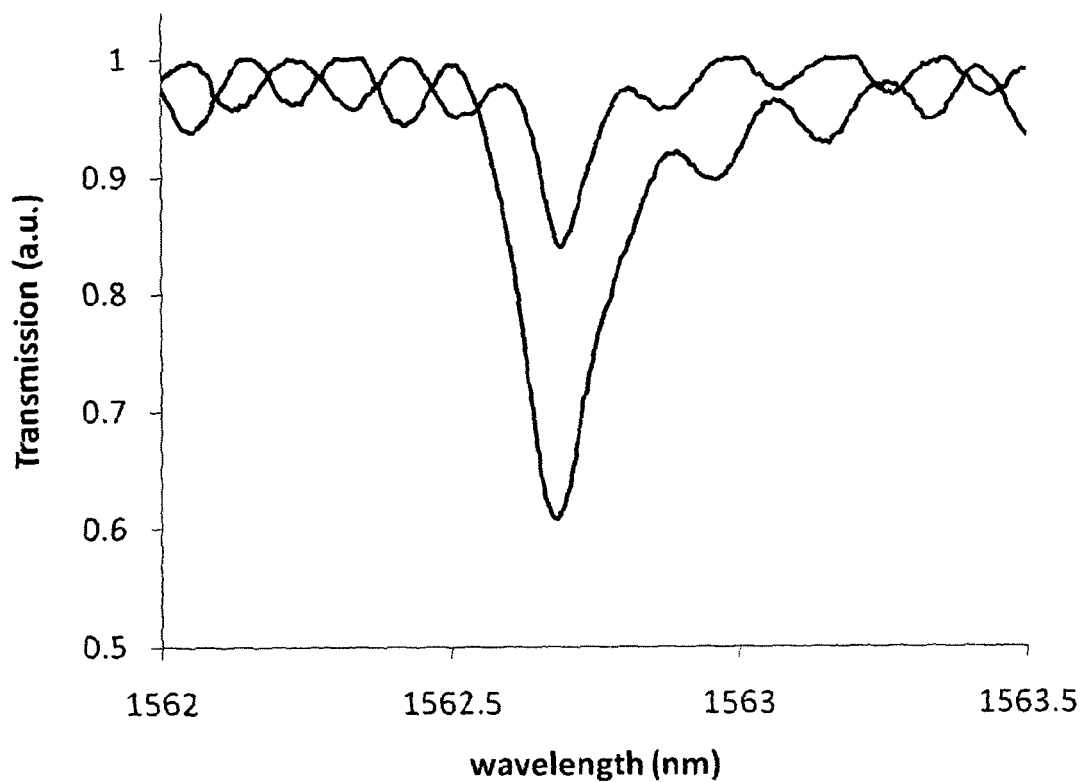
FIG. 9 shows experimental transmission curve response of different bus waveguides (with different effective refractive indices) coupled to nominally identically photonic crystal cavities.

FIG. 8a shows a close-up of the overlap area of the wave-vector space of the cavity with the wave-vectors of two different waveguides marked (A and B). With an appropriate choice of bus waveguide effective refractive index, there is a strong overlap resulting in strong coupling into the cavity, see curve A. Curve B shows that, due to the complexity of the k-space profile displayed in FIG. 8a, a relatively small change in $n_{eff}$ of the bus waveguide can change the overlap dramatically, therefore reducing the coupling efficiency. Current fabrication technologies can control the $n_{eff}$ of the bus waveguide within the necessary tolerances. FIG. 9 shows an experimental demonstration of this point. In this case, the cavity exhibits two modes with different resonant frequencies and wave-vector distributions. By changing the waveguide $n_{eff}$ the coupling into both modes can be widely varied.

Figure 10:
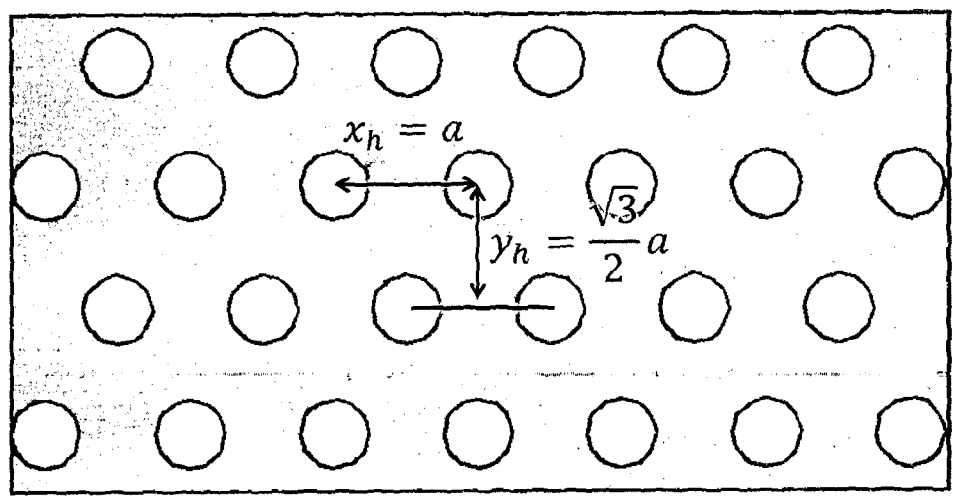
FIG. 10 shows a standard hexagonal PhC lattice with interhole spacing along the x-direction xh and inter-hole spacing in y-direction yh.
Figure 11:
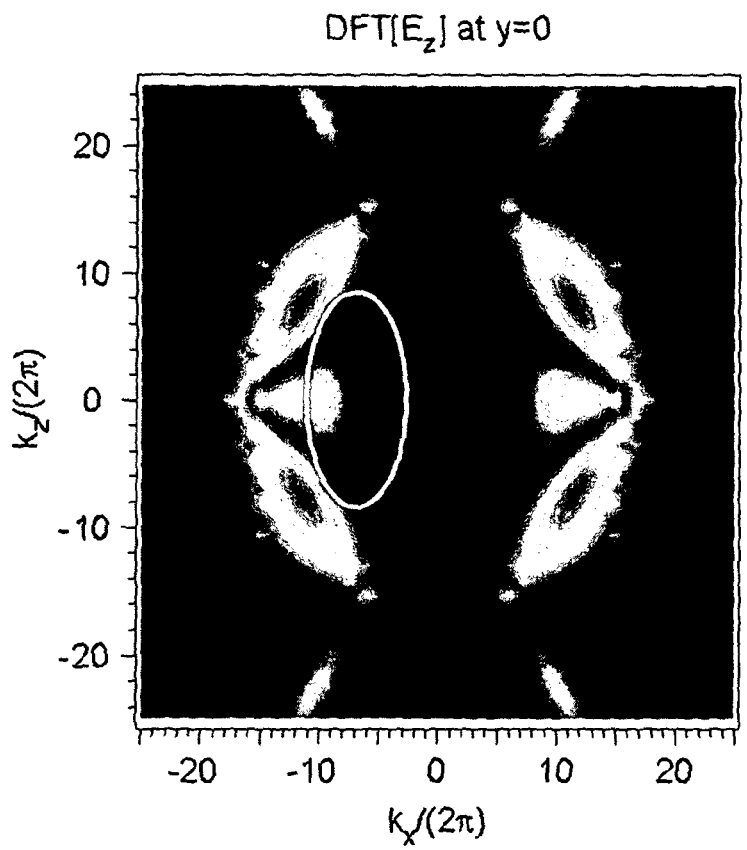
FIG. 11, shows the wave-vector space intensity profile.
Figure 12:
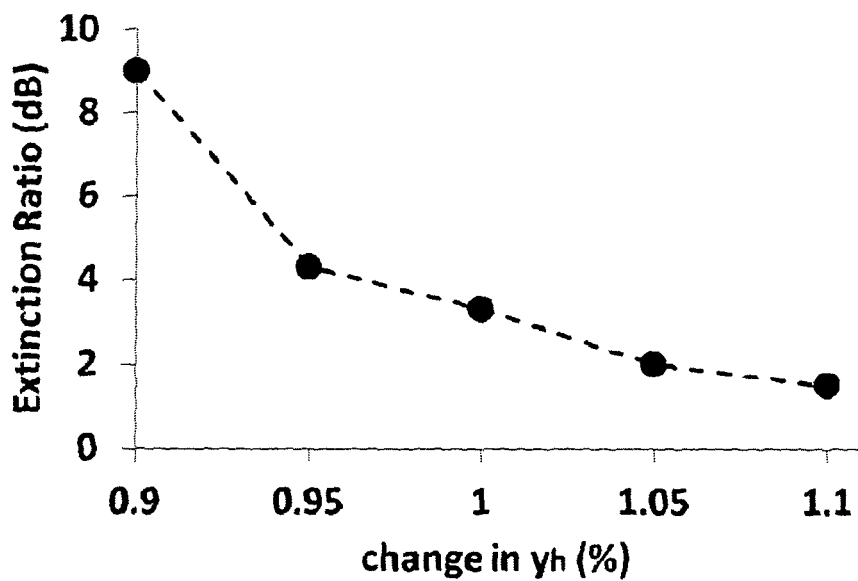
FIG. 12 shows the measured extinction ratios to the fundamental mode of a PhC cavity, as function of change in yh in percentage.

FIGS. 10-12 show an example of the way a photonic crystal cavity can be engineered so that the cavity mode exhibits a wave-vector space suitable for matching to that of a specific waveguide.

FIG. 10 shows a standard PhC lattice with inter-hole spacing along the x-direction xh and inter-hole spacing in y-direction yh. By distorting/squeezing/stretching the normal (hexagonal) photonic crystal lattice, the wave-vector space can be made to develop higher intensities in the desired regions, giving improved coupling.

Using a hexagonal lattice with an inter-hole spacing (spacing between the next neighboring holes) equal to the lattice period a as a starting point, the lattice can be distorted by stretching/squeezing the lattice in the x-direction and/or by stretching/squeezing the lattice in the y-direction. In the x-direction, the inter-hole distance $x_h$ changes from its original value a to a higher or smaller value and/or according to a analytical formulation. Likewise, in the y-direction, the vertical inter-hole spacing $y_h$ changes from its original value (sqrt(3)/2)*a to a higher or smaller value and/or according to a analytical formulation. As a result, the mode distribution is either indirectly altered due to changes in the photonic-crystal band-structure and their penetration depths in different directions; and/or directly altered due to mode-interaction with certain holes. This allows coupling to different types of photonic crystal cavities giving improved flexibility in the choice of parameters such as free spectral range and Q-factor.

The coupling efficiency of a specific photonic crystal cavity can be tuned/adjusted without influencing the cavity design strongly or even switching to a different type of cavity. An alternative approach to engineering the cavity k-space is to introduce a slot into the cavity, similar to that employed in [Applied Physics Letters 94, 063503 (2009) the contents of which are incorporated herein by reference] and/or rotating the cavity with respect to the waveguide.

FIG. 11 shows the wave-vector space intensity profile. By reducing this inter-hole spacing, distorting the original hexagonal lattice, the intensity of the wave-vector space increases in the circled region. In addition to the specific increase of intensities within a desired k-space region the lattice distortion can also be used to obtain the opposite effect. In that case, the intensities around k=0 (region of inhibited total internal reflection) can be reduced in order to decrease the photon loss out of the cavity. By either stretching/squeezing the lattice in x- and/or y-direction the Quality factor of a cavity can be improved.

FIG. 12 shows the measured extinction ratios of the fundamental mode of a PhC cavity, as a percentage function of change in yh. It can be observed that the extinction ratio decreases with an increase in Yh percentage.

Relative to previous works, such as U.S. Pat. No. 6,411,752 and Optics Letters 30, 1476-1478 (2005), in the device of the present invention, the options for wave-vector matching are greatly improved and efficient coupling between two dissimilar modes becomes possible. This principle of k-space matching allows the creation of a range of devices for many different applications. The following equation shows how this may be optimized for a particular application:

$$\frac{1}{Q_{total}} = \frac{1}{Q_{design}} + \frac{1}{Q_{coupling}} + \frac{1}{Q_{fabrication}}$$

$Q_{design}$ is the Q-factor of the cavity in isolation, given by simulation, $Q_{coupling}$ depends on the real space and k-space overlap between the bus waveguide and cavity mode. $Q_{fabrication}$ is given by the fabrication processes used to create the device.

The transmission (of the bus waveguide) on resonance with a resonator is given by:

$$T = \frac{Q_{total}^2}{Q_{design}^2} + \frac{Q_{total}^2}{Q_{fabrication}^2}$$

For typical values of $Q_{design}=500,000$, $Q_{fabrication}=750,000$, $Q_{total}=10,000$, the resonant transmission can be as low as 0.1%. Considering that the coupling losses of light between a lensed optical fiber and a SiONx waveguide can be as low as 0.2 dB, this system allows the creation of an optical modulator with high extinction ratios and low insertion losses. The modulation speed can be very high (greater than 40 GHz) as the Q is sufficient to allow carrier depletion to be used. For $Q_{total}=100,000$, T can be as low as 6%, meaning that 94% of the light is coupled into the cavity making this configuration very promising for non-linear applications.

A number of materials may be used for the construction of the WDM modulator device 6. The waveguide may be of a polymer such as Silicon oxynitride or of more complex composite structures such as TriPleX™ or HYDEX®, The barrier layer may be a dielectric material such as silica, deposited chemical vapor deposition techniques or using spin-on glass. The photonic crystal slab may be manufactured in Silicon, Silicon Nitride or in a III-V semiconductor material such as Indium Phosphide, Gallium Arsenide, Indium Gallium Phosphide or Gallium Nitride. It could also be made of a Silicon/Germanium multilayer. The structure of the photonic crystal lattice may vary according to specifications as well as the number and design of defect-cavity resonators and resonator-modulators. The lower cladding is typically made of silica, though air is possible in some instances. The substrate is silicon or a III-V semiconductor.

In addition, a number of optional functions may be incorporated into the device. For example, each resonator in the WDM device can perform a different signal processing function, including that of filter, ON/OFF switch, amplitude modulator and dispersion compensator.

A plurality of resonators can be coupled together to form a coupled cavity waveguide also referred to as coupled resonator optical waveguide (CROW). In this configuration the waveguide operates as an optical delay line with each defect-cavity producing a delay, thus producing a "slow light" overall. This design can be used to achieve a "flat-top" response function by combining a near-unity transmission for a given wavelength range (typically 0.1-10 nm) with a very sharp cut-off. Such response functions are particularly well suited for data transfer application.

A different type of resonator with engineered dispersion, referred to as "white light" cavity, has an optical path that is held constant over a given wavelength interval. In order to achieve the white light cavity condition ($\lambda/n=cst$), the refractive index of the cavity has to increase with wavelength. This requires operation in the "fast light" regime where the group velocity $\partial\omega/\partial k \rightarrow \infty$. Such "anomalous" dispersion characteristics can be achieved by dispersion engineering over a narrow wavelength range (e.g. $\Delta\lambda \approx 1$ nm, $\Delta n \approx 100$ GHz). This may be implemented by adding a cavity into the mirror regions of the the resonator, so that it acts as a Gires-Tournois Interferometer or by altering the waveguide portion of the resonator by means similar to those described in Optics Express 16, 6227-6232 (2008).

Figure 13:
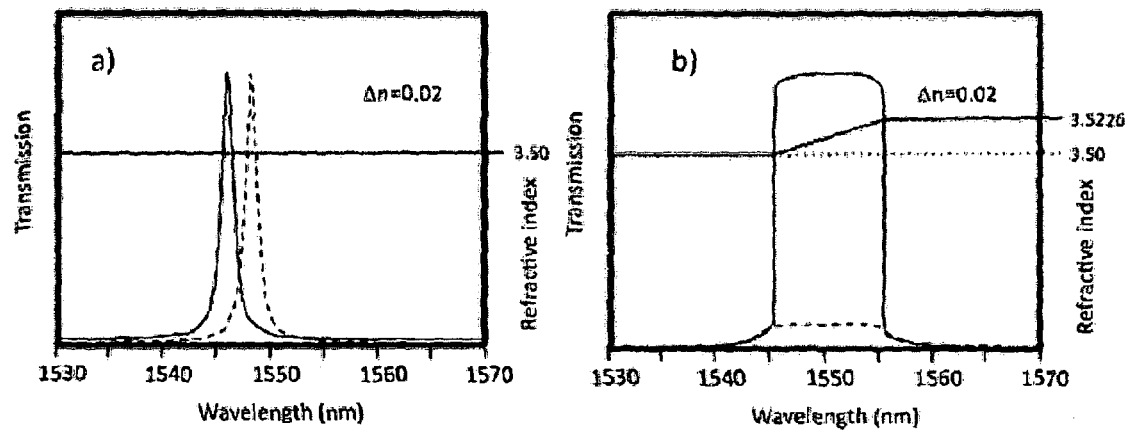
FIG. 13 shows the transmission spectrum of (a) a conventional cavity and (b) a white light cavity.

FIG. 13 shows a transmission spectrum calculated across a bandwidth of 10 nm for (a) a conventional cavity and (b) a white light cavity. The solid and dashed lines represent the transmission curves corresponding to a cavity with a refractive index of 3.50 and 3.52 respectively. In the conventional cavity case (a), tuning the refractive index by $\Delta n=0.02$ changes the cavity resonance curve by $\approx 3$ nm, according to $\Delta n/n=\Delta\lambda/\lambda$. When considering the white light cavity (b), tuning the cavity by $\Delta n=0.02$ turns the resonance entirely on and off (dashed line). This means that any switching action depends on the loss-limited quality factor "Q" as in a), but the bandwidth that can be accommodated depends on the spectral range over which suitable dispersion engineering can be achieved.

Other combinations of individual defect-cavity resonators can be chosen to create degenerate resonances at the resonance frequency. A cavity, or a combination of two cavities, can be designed such that it exhibits two degenerate resonances at the resonance frequency. This ensures that light coupled out of the cavity into the bus waveguide destructively interferes in the backward direction reducing or eliminating backward directions. A cavity exhibiting a single mode acts as a notch filter and will couple light back into the waveguide when on resonance. For some applications (where an optical isolator is inserted between the source and modulator for example), this back reflection is not a problem, making the single cavity approach an appropriate solution.

Figure 14:
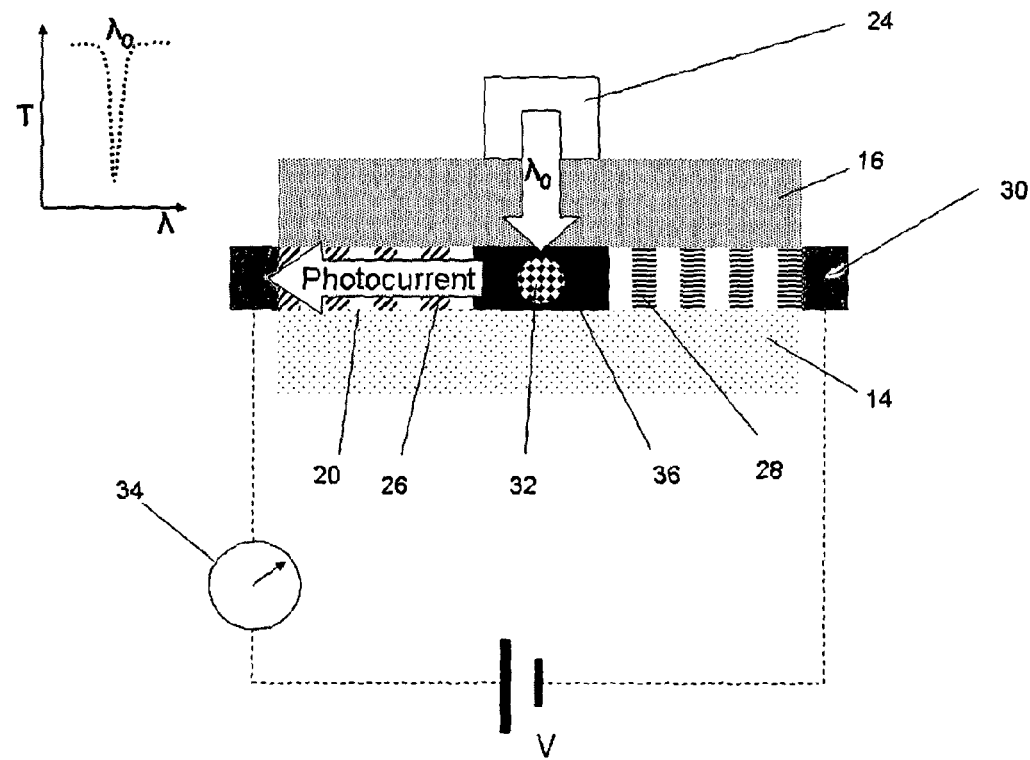
FIG. 14 shows a cross sectional view of the WDM modulator device operating as a frequency selective photo-detector.

A resonator-modulator may be configured as a frequency-selective photodetector. FIG. 14 shows a cross sectional view of the WDM modulator device operating as a frequency selective photo-detector. In this case, the defect-cavity is doped with an impurity 32 such as hydrogen or silicon. The doped defect-cavity 36 has an absorption band capable of generating photo-excited charge carriers upon coupling of a propagating mode at the resonant wavelength $\lambda_0$. The charge carriers are then extracted by the biased PIN junction surrounding the doped defect-cavity, giving rise to a photocurrent. The photocurrent, measured with a current detector 34 is proportional to the amount of wavelength-specific photo-generated carriers.

Figure 15:
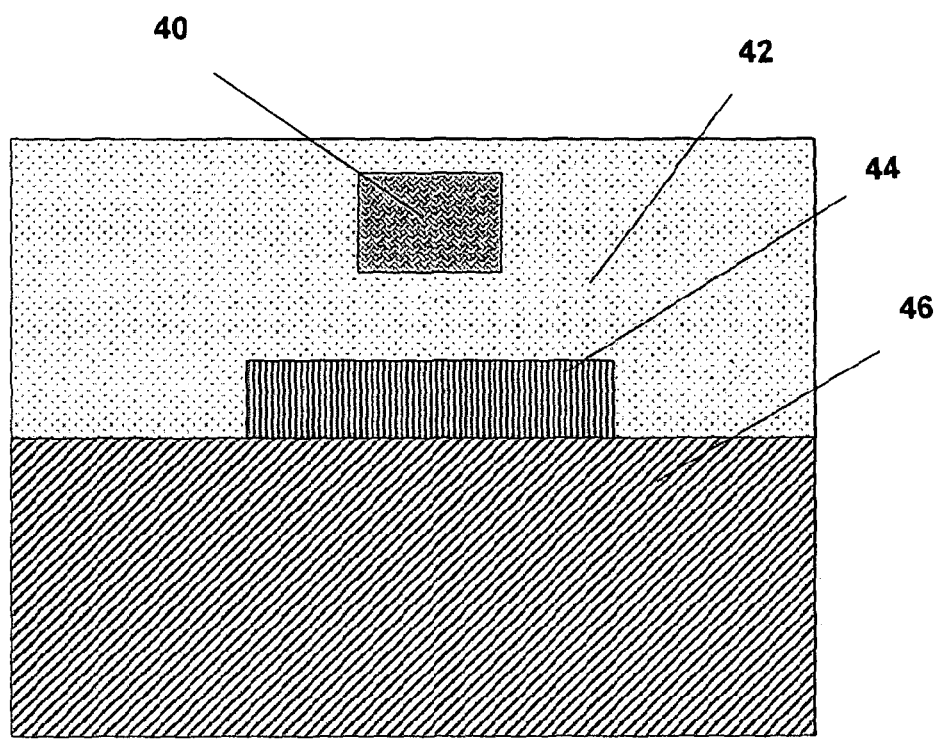
FIG. 15 shows a cross section of a resonator based on a metallic structure coupled to a bus waveguide.

Although the invention has been described primarily with reference to photonic crystal cavity defect resonators, other resonators may be used. For example, each resonator may be based on a metallic structure, such as a nanoantenna [Physical Review Letters 101, 116805 (2008)], or a plasmonic resonator [Optics Express 19, (6) 5268 (2011)] or split rings [Optics Letter 31, 1259 (2006)]. Similarly to the photonic crystal cavity case, tight mode confinement results in a broad k-space thereby allowing coupling between the bus and resonator. FIG. 15 shows one configuration. A bus waveguide 40 passes vertically over a metallic nanostructure 44 such that evanescent tails of the modes overlap. The metallic nanostructure 44 is positioned on a suitable substrate 46 and the entire structure encased in a suitable cladding material 42.

A skilled person will appreciate that variations of the disclosed arrangements are possible without departing from the invention. Accordingly, the above description of the specific embodiment is made by way of example only and not for the purposes of limitation. It will be clear to the skilled person that minor modifications may be made without significant changes to the operation described.

The invention claimed is:
1. A monolithically integrated optical device including:
    a waveguide of refractive index $n_a$ for carrying at least one mode of at least one wavelength;
    at least one resonator of refractive index $n_b$ with a resonant wavelength, wherein the at least one resonator has a mode volume of less than ten cubic resonant wavelengths, wherein in use light in the waveguide is vertically coupled into the at least one resonator, and the waveguide and the at least one resonator are arranged to provide wave-vector matching between at least one mode of the at least one resonator and at least one mode of the waveguide;

a barrier layer of refractive index $n_c$; and a lower cladding layer of refractive index $n_d$, wherein the at least one resonator is between the barrier layer and the lower cladding layer, and the waveguide is on top of the barrier layer and aligned with the at least one resonator, and wherein:
$n_c$ is less than $n_a$;
$n_c$ is less than $n_b$;
$n_b$ is not equal to $n_a$; and
$n_d$ is less than $n_b$.

2. The optical device as claimed in claim 1, wherein the waveguide carries a single mode or the waveguide is multi-mode.

3. The optical device as claimed in claim 1, wherein the at least one resonator carries a plurality of modes, among which at least one cavity-mode overlaps spatially with at least one mode propagating through the waveguide, thereby allowing for coupling of light from the waveguide to the at least one resonator.

4. The optical device as claimed in claim 1, wherein the optical device contains N wavelength specific resonators to be operable as an Nth order filter.

5. The optical device as claimed in claim 1, wherein the at least one resonator is embedded in a PIN junction forming a resonator-modulator.

6. The optical device as claimed in claim 5, wherein the at least one resonator-modulator is an electro-absorption modulator.

7. The optical device as claimed in claim 1 comprising a plurality of the resonators claimed in claim 1 coupled together to form a waveguide acting as an optical delay line.

8. The optical device as claimed in claim 7, wherein the waveguide has a flat-top spectral response.

9. The optical device as claimed in claim 1, wherein the at least one resonator is adapted to provide two degenerate resonances at a resonance frequency.

10. The optical device as claimed in claim 1, wherein the waveguide is one of:
a glass waveguide,
a TRIPLEX waveguide,
a HYDEX waveguide,
a polymer waveguide,
a waveguide made of Silicon Oxynitride, or
a dielectric waveguide.

11. The optical device as claimed in claim 1, wherein the barrier layer has a non-uniform thickness.

12. The optical device as claimed in claim 1, wherein the at least one resonator is selected from a photonic crystal defect cavity, a plasmonic structure, a nanoantenna, or a split ring.

13. The optical device as claimed in claim 12, wherein the photonic crystal has a network of holes forming a regular lattice defined by a set of parameters and wherein the parameters are selected to provide wave-vector matching between at least one mode of the at least one resonator and at least one mode of the waveguide.

14. The optical device as claimed in claim 13, wherein the parameters include at least a distance between two consecutive holes or an inter axial angle.

15. The optical device as claimed in claim 12, wherein the photonic crystal is made of Silicon Nitride or of a III-V semiconductor material.

16. The optical device as claimed in claim 1, wherein the at least one resonator is a photonic crystal and the at least one resonator has an engineered mode dispersion, so that the optical path inside the at least one resonator is constant over a given wavelength interval.

17. The optical device as claimed in claim 1, wherein the at least one resonator is a photonic crystal and the at least one resonator consists of a material, or is doped with material, wherein a resonant mode coupling into the cavity excites a photogenerated carrier.

18. The optical device as claimed in claim 1, wherein the at least one resonator is a photonic crystal resonator comprising a Silicon/Germanium multilayer.

19. The optical device as claimed in claim 1, wherein the lower cladding has a non-uniform thicknesses or a non-uniform composition.

20. The optical device as claimed claim 1, wherein multiple resonators are provided, each resonant at a different wavelength.

21. The optical device as claimed in claim 1, wherein a modulator is associated with the at least one resonator.

22. The optical device as claimed in claim 21, wherein the modulator is operable to change the resonant wavelength of its associated resonator.

23. The optical device as claimed in claim 1 adapted to function as a wavelength division mulitplexor.

* * * * *